(12) United States Patent
Becker et al.

(10) Patent No.: US 9,050,907 B2
(45) Date of Patent: Jun. 9, 2015

(54) RAIL GUIDE FOR A LONGITUDINAL ADJUSTMENT OF A MOTOR VEHICLE SEAT AND METHOD FOR PRODUCING SUCH A RAIL GUIDE

(75) Inventors: Burckhard Becker, Solingen (DE); Ingo Kienke, Wermelskirchen (DE); Alexander Balin, Ann Arbor, MI (US); Kurt Seibold, Whitmore Lake, MI (US)

(73) Assignee: Johnson Controls Metals and Mechanisms GmbH & Co., Solingen (DE)

( * ) Notice: Subject to any disclaimer, the term of this patent is extended or adjusted under 35 U.S.C. 154(b) by 0 days.

(21) Appl. No.: 14/236,507

(22) PCT Filed: Aug. 1, 2012

(86) PCT No.: PCT/EP2012/065064
§ 371 (c)(1),
(2), (4) Date: Jan. 31, 2014

(87) PCT Pub. No.: WO2013/017633
PCT Pub. Date: Feb. 7, 2013

(65) Prior Publication Data
US 2014/0175249 A1    Jun. 26, 2014

(30) Foreign Application Priority Data
Aug. 1, 2011 (DE) .......................... 10 2011 080 221

(51) Int. Cl.
*B60N 2/06* (2006.01)
*B60N 2/075* (2006.01)
(Continued)

(52) U.S. Cl.
CPC .............. *B60N 2/075* (2013.01); *B21D 19/08* (2013.01); *B21D 22/02* (2013.01); *B21D 53/88* (2013.01);
(Continued)

(58) Field of Classification Search
CPC .... B60N 2/0232; B60N 2/067; B60N 2/0715; B60N 2/0745
USPC ................ 296/65.13, 65.15, 65.14; 74/89.23; 248/429; 72/389.1
See application file for complete search history.

(56) References Cited

U.S. PATENT DOCUMENTS

| 4,569,563 A | 2/1986 | Fourrey |
| 5,012,613 A | 5/1991 | Sekine |

(Continued)

FOREIGN PATENT DOCUMENTS

| DE | 42 38 486 A1 | 10/1993 |
| DE | 10 2006 047 525 A1 | 5/2007 |

(Continued)

OTHER PUBLICATIONS
Machine Tranlsation of JP2006-305627A, printed from the JPO website, Sep. 18, 2014.*

*Primary Examiner* — Jason S Morrow
(74) *Attorney, Agent, or Firm* — McGlew and Tuttle, P.C.

(57) ABSTRACT

A rail guide that has at least one rail pair consisting of a floor rail (22) and a seat rail (24). The seat rail (24) has connectors (30) for fastening a seat frame to be arranged above the rail pair. The rails can be moved relative to each other in a longitudinal direction along a movement path (20). The floor rail (22) and the seat rail (24) are curved by the same circular radius of curvature (42) that ranges between 1,500 and 3,000 mm, in particular between 1,800 and 2,500 mm. The center point of curvature (44) is on the side of the rail pair facing away from the seat frame. The rail guide is a longitudinal adjustment device having a stationary spindle (52) and an associated spindle nut (54) that is longitudinally movable thereon, the spindle (52) being curved at the same circular radius of curvature (42). Also described is a suitable method for producing said curved rails by at least one stamping mold (68) or by bending strips (96).

6 Claims, 6 Drawing Sheets (51) Int. Cl.
  *B21D 19/08* (2006.01)
  *B21D 22/02* (2006.01)
  *B21D 53/88* (2006.01)
  *B60N 2/02* (2006.01)
  *B60N 2/07* (2006.01)
  *B60N 2/16* (2006.01)
  *B60N 2/18* (2006.01)

(52) U.S. Cl.
  CPC .............. *B60N 2/0232* (2013.01); *B60N 2/067* (2013.01); *B60N 2/0715* (2013.01); *B60N 2/0745* (2013.01); *B60N 2/0747* (2013.01); *B60N 2/1695* (2013.01); *B60N 2/1832* (2013.01); *B60N 2/1853* (2013.01); *B60N 2/06* (2013.01)

(56) References Cited

U.S. PATENT DOCUMENTS

| | | | |
|---|---|---|---|
| 5,103,126 A * | 4/1992 | Mehnert | 310/80 |
| 5,941,495 A | 8/1999 | Bauer et al. | |
| 8,038,197 B2 * | 10/2011 | Koga | 296/65.18 |
| 8,328,155 B2 * | 12/2012 | Kostin | 248/429 |
| 2005/0269478 A1 * | 12/2005 | Woehrle et al. | 248/430 |
| 2010/0320352 A1 * | 12/2010 | Weber | 248/429 |
| 2011/0079699 A1 * | 4/2011 | Tarusawa et al. | 248/430 |
| 2012/0205511 A1 * | 8/2012 | Hofmann | 248/429 |

FOREIGN PATENT DOCUMENTS

| | | |
|---|---|---|
| DE | 10 2006 048 786 A1 | 5/2007 |
| EP | 0 123 601 A1 | 10/1984 |
| EP | 0 437 257 A1 | 7/1991 |
| EP | 1 316 465 B1 | 6/2003 |
| EP | 1 602 418 A2 | 12/2005 |
| EP | 1 645 458 A1 | 4/2006 |
| GB | 2 071 486 A | 9/1981 |
| JP | H01 87042 U | 6/1989 |
| JP | 11 090534 A | 4/1999 |
| JP | 2006 305627 A | 11/2006 |
| WO | 99/51456 A1 | 10/1999 |

* cited by examiner

RAIL GUIDE FOR A LONGITUDINAL ADJUSTMENT OF A MOTOR VEHICLE SEAT AND METHOD FOR PRODUCING SUCH A RAIL GUIDE

CROSS REFERENCE TO RELATED APPLICATIONS

This application is a United States National Phase Application of International Application PCT/EP2012/065064 filed Aug. 1, 2012 and claims the benefit of priority under 35 U.S.C. §119 of German Patent Application 10 2011 080 221.5 filed Aug. 1, 2011, the entire contents of which are incorporated herein by reference.

FIELD OF THE INVENTION

The invention relates to a rail guide for a longitudinal adjustment mechanism of a motor vehicle seat with at least one pair of rails, which comprises a floor rail, a seat rail and guiding means disposed between these two rails, the rails of the pair of rails being displaceable relative to each other along a displacement path in a longitudinal direction, which is substantially parallel to an x-axis, and the seat rail comprising means for fastening a seat frame to be disposed above the pair of rails.

BACKGROUND OF THE INVENTION

Such a rail guide is known from DE 42 38 486 A1, for example FIG. 2 of DE 42 38 486 A1. Other rail guides are known from U.S. Pat. No. 5,941,495 A and DE 10 2006 048 786 A1. Additionally, reference is made to DE 10 2006 047 525 A1.

The two rails of a pair of rails in the rail guides according to the prior art extend in a straight line. This has great advantages; the rails can be manufactured and, if necessary, aligned with precision, attachments are simple and a consistently good adjustability over the entire length of the adjustment distance can be obtained.

In the case of straight rails, there is, however, the disadvantage that the seat is only moved in a linear manner in space when adjusted, but that no other movements are possible. However, it was now found out that a tall passenger, who sets the seat far towards the rear and low in a downward direction, generally also inclines the backrest more towards the rear relative to the vertical than a smaller passenger, who will set his seat more towards the front and higher. According to the prior art, the inclination of the backrest can only be adjusted by means of a separate backrest joint. However, if such a joint is provided, this means a certain expenditure. The inclination of the seat surface is also chosen differently by tall and small persons. In order to be able to adjust the inclination of seat surface, there are seat inclination adjustment mechanisms. They offer good comfort but also require added expenditure. A height adjustment mechanism with which the height of the seat surface can be adjusted is also frequently provided. In principle, these and any other additional adjustment device mean added weight and expenditure as regards material and assembly.

SUMMARY OF THE INVENTION

The invention is based on the above background. The invention has the object to provide a rail guide that provides by itself as good a setting as possible for the entire range of passengers so that additional setting devices beyond the longitudinal adjustment mechanism can be omitted as far as possible. In this case, the rail guide is supposed to still have a simple structure; the rail guide is supposed to satisfy the requirements made to a rail guide according to the prior art. The rail guide is supposed to be suitable for manual and motor-operated adjustment devices.

Based on the rail guide of the type mentioned in the introduction, this object is achieved by the floor rail and the seat rail each being curved with the same circular radius of curvature, that the radius of curvature is between 1,500 and 3,000 mm, in particular between 1,800 and 2,500 mm, and that the center of curvature is located on the side of the pair of rails facing away from the seat frame.

In contrast to the prior art, the adjustment direction along the displacement path no longer extends on a straight line, but on an arc of a circle. The particular choice of radii of curvature within the specified limits results in a seat that is located far back in the rail guide being positioned slightly more obliquely towards the rear and, additionally, lower than a seat that is set in the front region of the rail guide. This makes it possible to dispense with additional setting devices, such as a seat height adjustment mechanism and/or backrest inclination adjustment mechanism. This means that a considerable amount of weight can be saved. In this way, a motor vehicle seat can be formed to be significantly lighter than in accordance with the prior art.

The curvature following an arc of a circle has a center of curvature which, in the installed state of the motor vehicle seat, is located underneath this seat. The center of curvature is located on the side of the rail guide that faces away from the seat region and the backrest.

Rails with such a radius of curvature can be manufactured with precision. Despite the displacement no longer being linear, good synchronism, precise guidance and a high degree of manufacturing precision are achieved. One of the rails still preferably is the clasping rail and the other the clasped rail. Preferably, the two rails rest against each other with an elastic bias. The two rails rest against each other by means of rolling or sliding members. They form the guiding means. Production inaccuracies are compensated and the guiding means held in their position due to this elasticity. The rails both have a length of at least 25 cm; one of the two rails has a length of at least 30 cm. Preferably, the rails are made from a steel sheet having a yield point of at least 600 N/mm2. Thus, metal sheets with a thickness of, for example, 1.5 mm can be used. The range of thickness is 1.2 to 1.8 mm, preferably 1.5+10% and −30%. The thinner the metal sheet, the lower the weight of the rail.

Preferably, the two rails are each produced individually as a stamped-bent part. This is started with a steel sheet blank, in particular a wide band. This blank is elongated; it is either banana-shaped or saber-shaped if the rail is to be mounted in such a way that a base flange lies in the x-z-plane, or substantially rectangular if the rail is to be mounted in such a way that a base flange lies in the x-y-plane. This blank is preferably bent in several individual bending steps about two parallel bending lines, respectively. These are realized by means of bending bars. Bending processes are carried out along and in the vicinity of the longitudinal edges. Preferably, the profile of the finished rail is axially symmetrical or substantially axially symmetrical relative to an axis that is a midperpendicular to the base flange.

In order to produce a rail which is to be mounted in such a way that the base flange lies in the x-y-plane, the following procedure is preferably used: In a first processing step, the blank is bent, with the bending line having a radius matching the radius of curvature or deviating by up to 3%. The center point is located in the vicinity of or on the center point line; the latter extends parallel to the short edges of the blank. The blank then follows a cylinder jacket. In a second bending step, one lateral first leg, respectively, is bent on the left and the right, parallel to the respective longitudinal edge of the blank. This is done about a bending line lying on an arc of a circle. The bending line has a radius that can deviate from the radius of curvature by up to 3%. Generally, it does not match the radius of curvature. Its center point is located in the vicinity of or on the center point line. At least one further leg is bent in at least one further bending step. Here, the procedure is the same as in the second bending step. When producing a rail that is to be mounted in such a way that the base flange lies in the x-z-plane, the first processing step is omitted and the process is started directly with the second bending step.

A distortion or warping occurs due to the use of high-strength steel material and the bending steps. The legs and, if applicable, also the base flange of the subsequent rail show irregularities; they do not run exactly on a cylinder jacket surface or a smooth, regularly curved surface. The more high-strength the steel, the greater the yield point, the greater the inner stresses, and thus the warpage, in the material during the bending steps. Therefore, the warpage and stresses have to be compensated after at least one bending step, preferably after two or three bending steps. This is done in a calibrating step. In the process, the rail is straightened. The distortion is eliminated. This is done by bending over towards the opposite side, i.e. in the direction opposite to the previous bending direction. A plastic deformation is carried out in the process. The lateral flank is straightened in this manner. Optionally, another region is also straightened.

The bending processes take place by applying bending bars to the blank and bending around the bending bars. The bending bars have a curvature about the center of curvature with a deviation with respect to the radius of less than +/−3% of the radius of curvature. Bending steps are carried out as they are also carried out in the case of rails extending in a straight line. However, bending bars are being used now that do not extend in a straight line but are curved with the bending radius.

Preferably, the rail guide is associated with an actuating drive for longitudinal adjustment. This actuating drive preferably comprises a rotary drive having an output shaft and a gear unit comprising a spindle nut rotationally connected to the output shaft and having a spindle; in this case, the spindle comprises a spindle thread with which the spindle nut is in engagement; the spindle is curved with the same circular radius of curvature as the rails; the spindle nut is a straight nut.

Preferably, the motor vehicle seat is provided with a motor-operated adjustment device which provides for the adjustment along the displacement path. The rotary drive unit can also be designed for manual adjustment. In that case, the rotary drive unit is to be actuated by hand It comprises, for example, a crank which is within the reach of a passenger and via which the passenger introduces the rotary movement into the gear unit. In contrast to a rail guide according to the prior art, which lacks a rotary drive unit and is equipped with a locking device to be operated manually, no spring is required that biases the seat forward within its rail guide. This spring must have a considerable spring force; it contributes to the overall weight. Such a spring is saved.

It is also an object of the invention to provide a method for producing such a rail guide. According to this method, the floor rail and the seat rail are each manufactured from a suitable blank; this blank extends along the radii of curvature that the finished rail has. The blanks are stamped in at least one respective stamping die; stamping takes place in at least one stamping step. In this way, the finished rail is prepared.

This method is advantageous in that the desired accuracies are achieved. Rails can be produced in this manner that are easily adjustable despite the curved profile of the displacement path, that are guided within each other precisely, and that have good sliding properties.

Usually, a longitudinal adjustment mechanism has two rail guides which are largely constructionally identical. In the case of a motor vehicle seat with two rail guides, both rail guides are bent with the same radius of curvature.

The floor rail preferably has fastening regions; with these, it can be connected to a floor assembly of the motor vehicle.

The invention also relates to a motor vehicle seat with a rail guide as described above. In this motor vehicle seat, the seat frame comprises connecting parts; the connecting parts are preferably connected to the means for fastening the two seat rails of each side.

Preferably, such a motor vehicle seat has no further setting device, in particular no seat height adjustment mechanism and/or no backrest inclination adjustment mechanism.

Finally, the invention also relates to a motor vehicle equipped with a rail guide or a motor vehicle seat as described above. In this motor vehicle, the rail guide is disposed in such a way that, in the rearmost position of the longitudinal adjustment mechanism, the motor vehicle seat, particularly its backrest, is inclined rearwards at an angle of 10° to 15° measured from the vertical, and in the foremost position is inclined rearwards at an angle of 5° to 10°, again measured from the vertical, with the change of angle between these two positions being at least 4°, preferably 6°. In this way, the desired adjustment positions are obtained directly by means of the rail guide without any additional setting devices being required. This results in a significant advantage with regard to cost and weight.

In the motor vehicle seat, the seat region is preferably rigidly connected to the rails. Preferably, no setting devices are provided between the seat rail and the seat region. This saves the components of a seat height adjustment mechanism and/or seat inclination adjustment mechanism which are usually provided. These components include, for example, a seat-lifting spring that has to have a certain spring force, which means a considerable amount of weight; joint arms and setting devices, for example wobble joint fittings, are saved.

Preferably, all centers of curvature of partial areas of the rails and, if applicable, an associated curved spindle, lie on a center point line which is a parallel to the y-axis. The individual radii extend perpendicular to this center point line. Their center points lie on the center point line. In the case of a longitudinal guide with two rail guides, the centers of curvature of both rail guides lie on the same center point line, but at different points thereon. In each individual rail of a rail guide, the centers of the radii of curvature of the edges lie on the center point line. There, they have the same spacing from each other as they are spaced in the rail itself in the y-direction. The radii of curvature of different partial regions of the rails are different. They extend concentrically with respect to each other. This particularly applies to those partial regions of a rail that are in contact with the other rail.

Other advantages and features of the invention become apparent from the other claims as well as from the following description of an exemplary embodiment of the invention, which shall be understood not to be limiting and which will be explained below with reference to the drawing. The various features of novelty which characterize the invention are pointed out with particularity in the claims annexed to and forming a part of this disclosure. For a better understanding of the invention, its operating advantages and specific objects attained by its uses, reference is made to the accompanying

DESCRIPTION OF THE PREFERRED EMBODIMENTS

Figure 1:
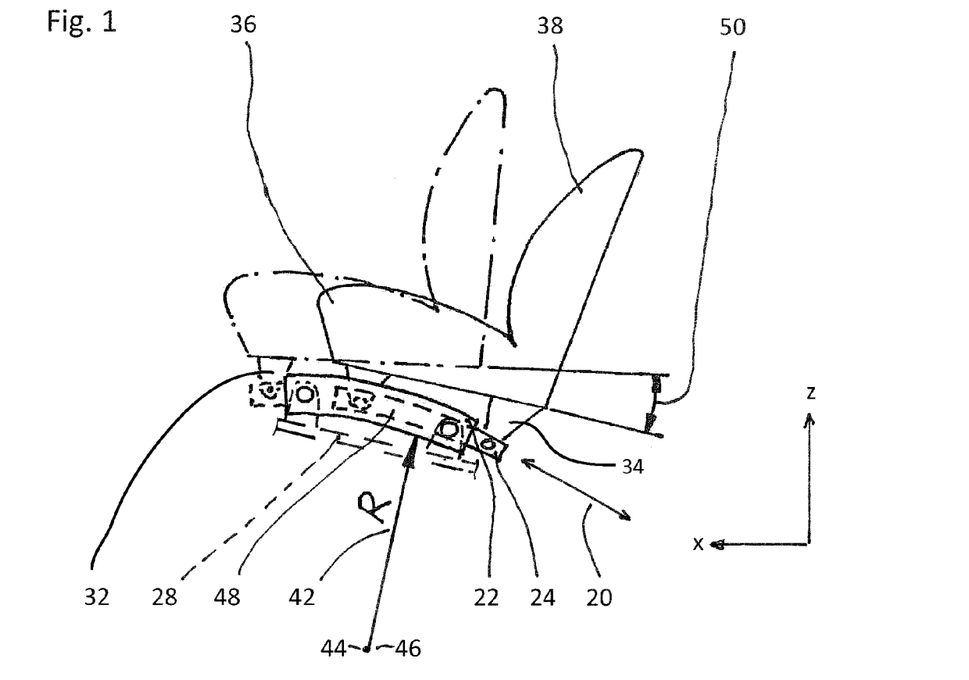
FIG. 1 is a schematic side view of a motor vehicle seat with a curved rail guide.

Referring to the drawings in particular, the motor vehicle seat shown in FIG. 1 is shown in two different extreme positions, namely in continuous lines in a rearmost position and in dash-dotted lines in a foremost position. Both positions are reached along a displacement path 20 extending on an arc of a circle.

In the known manner, the motor vehicle seat has at least one pair of rails comprising a floor rail 22, a seat rail 24 and guiding means 26. In the exemplary embodiment shown, two rail guides disposed parallel to each other are provided. In the exemplary embodiment, they are constructionally identical. The guiding means 26 are configured as balls; other configurations are possible. The floor rail 22 is substantially C-shaped. It is formed as a grasping rail. It comprises means for fastening to a floor assembly 28 of a motor vehicle that is otherwise not shown in more detail. The seat rail 24 is a rail which is grasped; it is also substantially C-shaped. It comprises means 30 which are in this case configured as openings; they serve for connection to a front connecting part 32 and a rear connecting part 34 for each seat side. These connecting parts 32, 34 support a seat region 36. The latter is rigidly connected to the seat rail 24. A backrest 38 is provided. As FIG. 1 shows, no means are provided for seat inclination adjustment, seat height adjustment and inclination adjustment of the backrest 38.

A right-handed x-y-z coordinate system is used for the description. The x-axis and the y-axis lie in the horizontal. The x-axis points in the direction of normal straight travel of the motor vehicle. The z-axis extends parallel to a vertical.

The two rails 22, 24 of each rail guide delimit a channel-shaped cavity 40. It is open only in the x-direction.

The floor rail 22 and the seat rail 24 are curved each with the same circular radius of curvature. The displacement path 20 has at least a length of 150 mm and at most a length of 350 mm. Preferably, the displacement path 20 is in the range of 250 mm to 300 mm. The radius of curvature R 42 is between 1,500 and 3,000 m, in particular between 1,800 and 2,500 mm. A center 44 of curvature lies on a center point line 46, which is a parallel to the y-axis. The radii 42 of curvature for the individual edges of a rail 22 or 24 have different lengths and also different centers of curvature. All centers of curvature lie on a center point line 46. The radii each extend perpendicular to the center point line 46; in FIG. 2, this is represented by a corresponding symbol. The centers 44 of curvature of two different longitudinal edges of a rail 22 or 24 have, in the rail itself, the same spacing in the y-direction as on the center point line 46. Each rail 22 or 24 has a constant cross section, seen over its length. The cross section is determined on a cross-sectional plane; the center point line 46 lies in the respective cross-sectional plane. The individual cross-sectional planes are at an angle relative to each other.

Both rails 22, 24 each have a base flange 48. This base flange extends in a plane parallel to the x-z-plane. The base flange 48 has the shape of a circular disc sector.

The two pairs of rails of the motor vehicle seat are offset only in the y-direction; in the x-direction and z-direction, they have matching coordinates. The offset in the y-direction corresponds to at least half the width of the seat region and is at most 120% of the width in the y-direction of the seat region.

FIG. 1 shows the state of the motor vehicle seat installed in the motor vehicle (not shown). In this state of installation, the rear end of the rails 20, 22 is the lowermost point. The designation front corresponds to the positive direction of the x-direction, and top corresponds to the positive direction of the z-axis.

The rail guide is disposed in the motor vehicle so as to rise towards the front. A tangent drawn to the foremost region of the floor rail 22 substantially extends parallel to the x-y-plane. The tangent deviates from this plane by preferably only ±° 5, particularly only ±° 3.

In a foremost position, the seat region 36 is inclined rearwards by an angle relative to the horizontal x-y-plane that is approximately 3°. The angle range can be 0 to 6°. Within the displacement path 20, a change 50 of angle by about 10° is achieved. This change of angle can be between 4 and 12°.

In the exemplary embodiment, the length of the front connecting parts 32 is slightly less, for example, 5 to 30% less, than the length of the rear connecting parts 34. The front connecting parts 32 of each seat side and also the rear connecting parts 34 of each seat side are of equal length in the longitudinal direction, which substantially matches the z-direction.

The center point line 46 is the location of the centers 44 of curvature. The latter are located underneath the rail guide and thus on the other side of the rail guide from the seat region 36 and the backrest 38.

Figure 2:
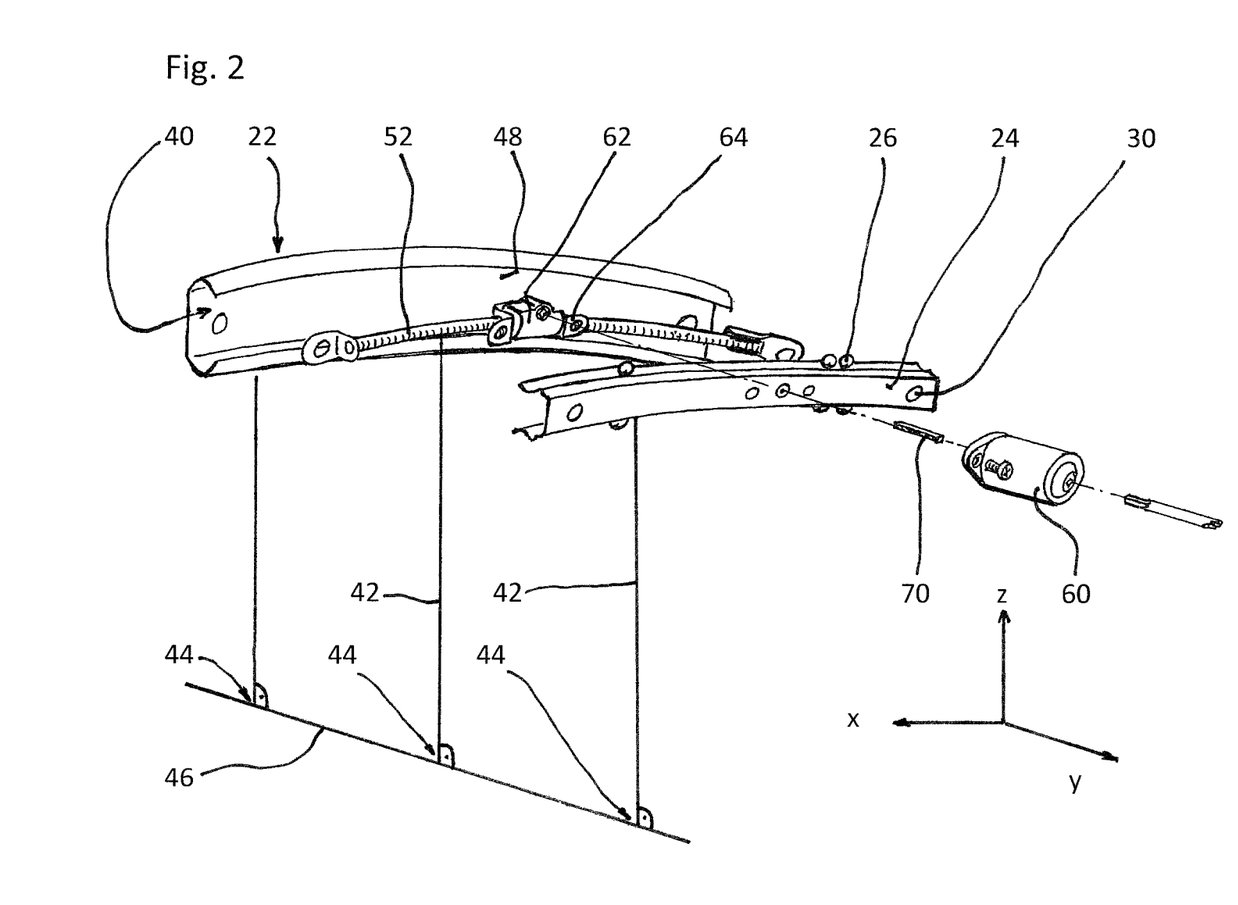
FIG. 2 is a perspective view in the form of an assembly view of a rail guide with an additional spindle drive.
Figure 3:
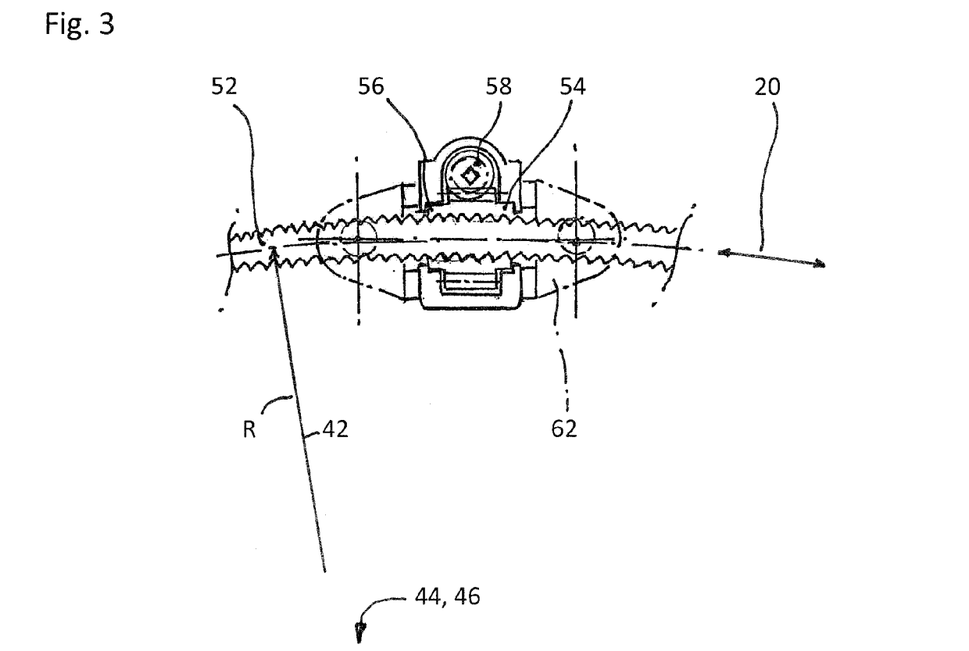
FIG. 3 is an axial cross sectional view through a spindle of a spindle drive with a spindle nut, housing and accessories, only the region around the spindle nut is shown.

A motor-operated adjustment device is provided which enables an adjustment of the motor vehicle seat within the displacement path 20. In a manner known per se, it comprises a spindle 52 which is non-rotatably connected at its ends to the floor rail 22 via brackets. In contrast to the prior art, the spindle 52 is curved along a circular line. This circular line has a radius of curvature corresponding to the radius of curvature of the rails 22, 24. The center of curvature lies on the center point line 46. Spindles with a diameter of 6 to 10 mm are being used, for example a spindle with an M8 thread. In a manner known per se, the spindle 52 is grasped by a spindle nut 54. This spindle nut 54 is straight. It has a length of 10 to 20 mm. Preferably, it is selected to be short. A length of 10 to 15 mm is preferred. The spindle nut 54 is a nut in accordance with the prior art. Preferably, however, the spindle nut 54 has a starting region 56 on each axial side that is configured in a conical manner or a manner that expands outwards in another manner. Due to the starting regions 56, a jamming of the spindle nut 54 is counteracted.

In a manner known per se, an external worm wheel is formed on the spindle nut, which is in engagement with a worm 58. The latter is connected to an electric motor 60 via an elastic output shaft 70. The electric motor 60 is responsible for both seat sides; it is connected to the rail guide of the other seat side via another elastic shaft. This is the prior art.

In a preferred alternative, a manual drive is used instead of an electric motor; in this case, a crank can be used, for example. The latter can be disposed underneath the front edge of the seat and have an axis of rotation substantially extending in the x-direction. It is connected to the two seat sides via elastic shafts.

The spindle nut 54 and the worm 58 are accommodated in a housing 62. The housing 62 is grasped by a clamp 64 that is substantially U-shaped. It has fastening areas; they are connected to the seat rail 24; for this purpose, the seat rail 24 comprises fastening holes. A passage of the seat rail 24 for the elastic output shaft 70 is located in the middle between the two fastening holes.

A first method for producing the seat rail 22, 24 as it is suitable for the exemplary embodiment according to FIGS. 1 and 3 is described below, i.e. for fastening to a component substantially extending in the x-y-plane.

Figure 4:
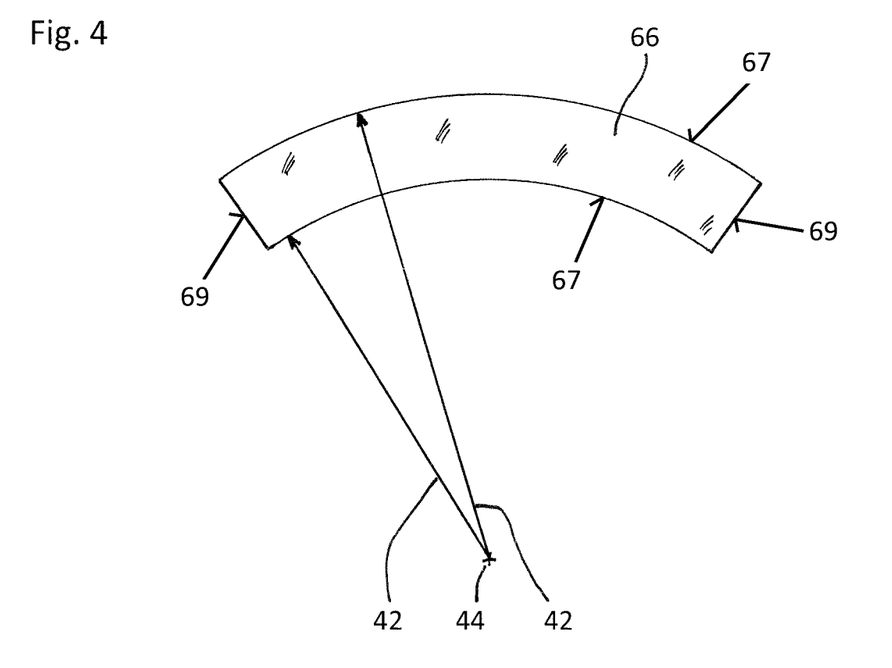
FIG. 4 is a top view of a blank for a rail.

FIG. 4 shows a banana-shaped or saber-shaped blank 66. It is cut from a metal sheet material. Steel sheet grades and thicknesses as in the prior art are used. In contrast to the prior art, the blank 66 is delimited by arcs of a circle having a radius of curvature corresponding to that of the finished rail. The blanks are laterally delimited by longitudinal edges 67 in the form of radial lines. As FIG. 4 shows, the centers of curvature 44 substantially lie on a line extending in the paper plane which corresponds to the subsequent center point line 46. The centers of curvature 44 are distributed over a length corresponding to the thickness of the blank 66. The radius deviates from the radius of curvature by less than 3%. The blank has short transverse edges 69.

Figure 5:
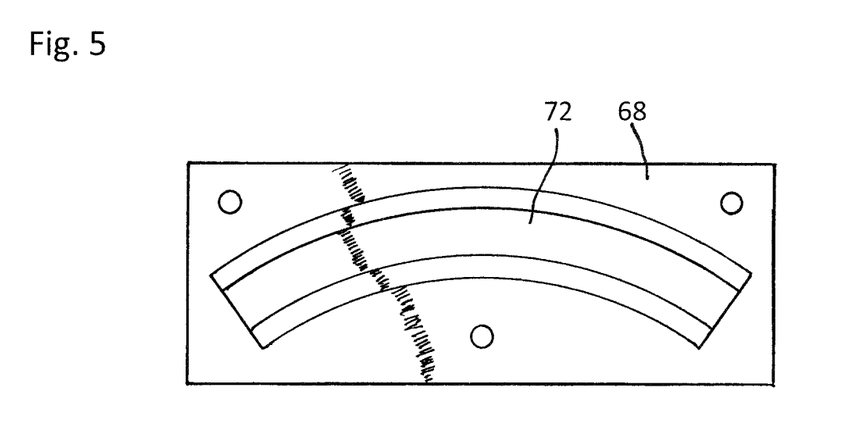
FIG. 5 is a schematic view of a stamping die with a top view of the die cavity.

FIG. 5 shows a part of a stamping die 68; only a schematic view is being shown. The stamping die 68 is associated with a corresponding counter die; the latter is not shown. Stamping the blank 66 can take place in a single stamping die 68 with a female and male die; however, several stamping steps in different stamping dies 68 can also be carried out. The blank 66 is inserted into the stamping die 68, then the counter die is added and the stamping process is carried out.

A production of the rail 22, 24 by gradually forming it along the curvature profile is possible; such a process would be, for example, a rolling or bending process.

Figures 6, 7, 8:
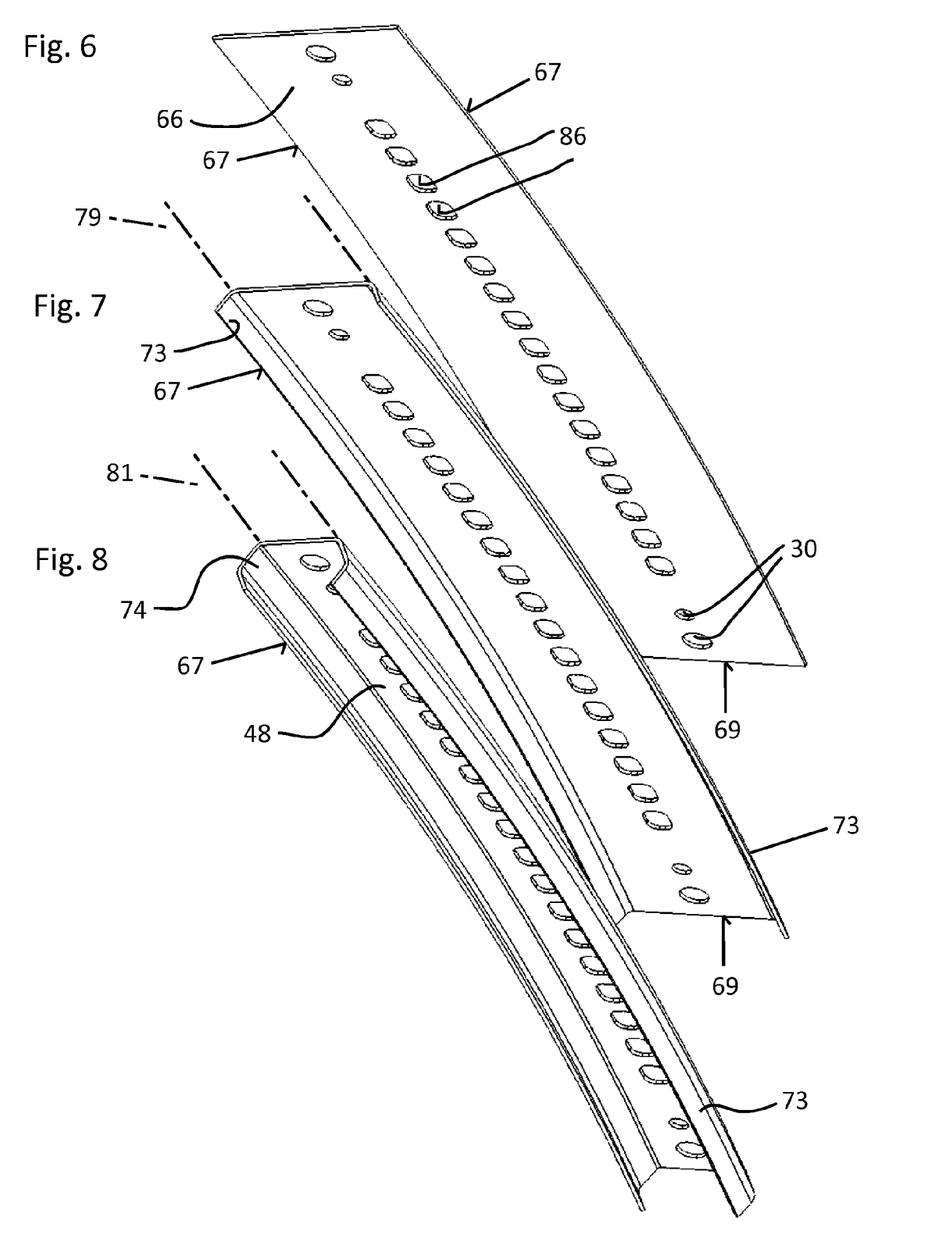
FIG. 6 is a perspective view of a blank for an outer rail.
FIG. 7 is the blank according to FIG. 6 after a first bending stage.
FIG. 8 is the blank according to FIG. 6 after a second bending stage.

Another method will now be described with reference to the FIGS. 6-8 and 9-13. FIG. 6 shows a perspective view of a blank 66, from which an outer rail is to be manufactured. It is intended for fastening to a component that substantially extends in the x-y-plane. The blank 66 is already bent so as to follow a cylinder jacket whose axis is determined by the center point line 46 (with a maximum deviation of 3% of the length of the radius). In other words, the longitudinal edges 67 now run along an arc of a circle with a radius that deviates by maximally 3% from the radius 42 of curvature. The transverse edge 69 extends parallel to the center point line 46.

A first bending stage is carried out in FIG. 7. In the process, first legs 73 have been bent parallel to the two longitudinal edges 67 and in their vicinity. A first bending line 79 extends along an arc of a circle with a radius that deviates by maximally 3% from the radius 42 of curvature.

FIG. 8 shows the condition after a second bending step along second bending lines 81; the latter are located within the first bending lines 79 of the first bending step; second legs 74 are being bent. The high-strength material used has warped due to the bending steps; it has warped and twisted slightly. The irregularities are eliminated by a calibrating step. The calibrating step is also referred to as a compensating step or correction bending step. In the process, the first leg 73 and/or the second leg 74 are each bent over and plastically deformed in the direction opposite to the previous respective bending step in such a way that the warpage is reduced and the outer surface of the respective leg 73, 74 has a regular, smooth profile.

The inner rail is prepared analogously to the outer rail; this is described below; however, more than two bending steps are carried out. Generally, 92 refers to a bending line.

Figures 9, 10, 11, 12, 13:
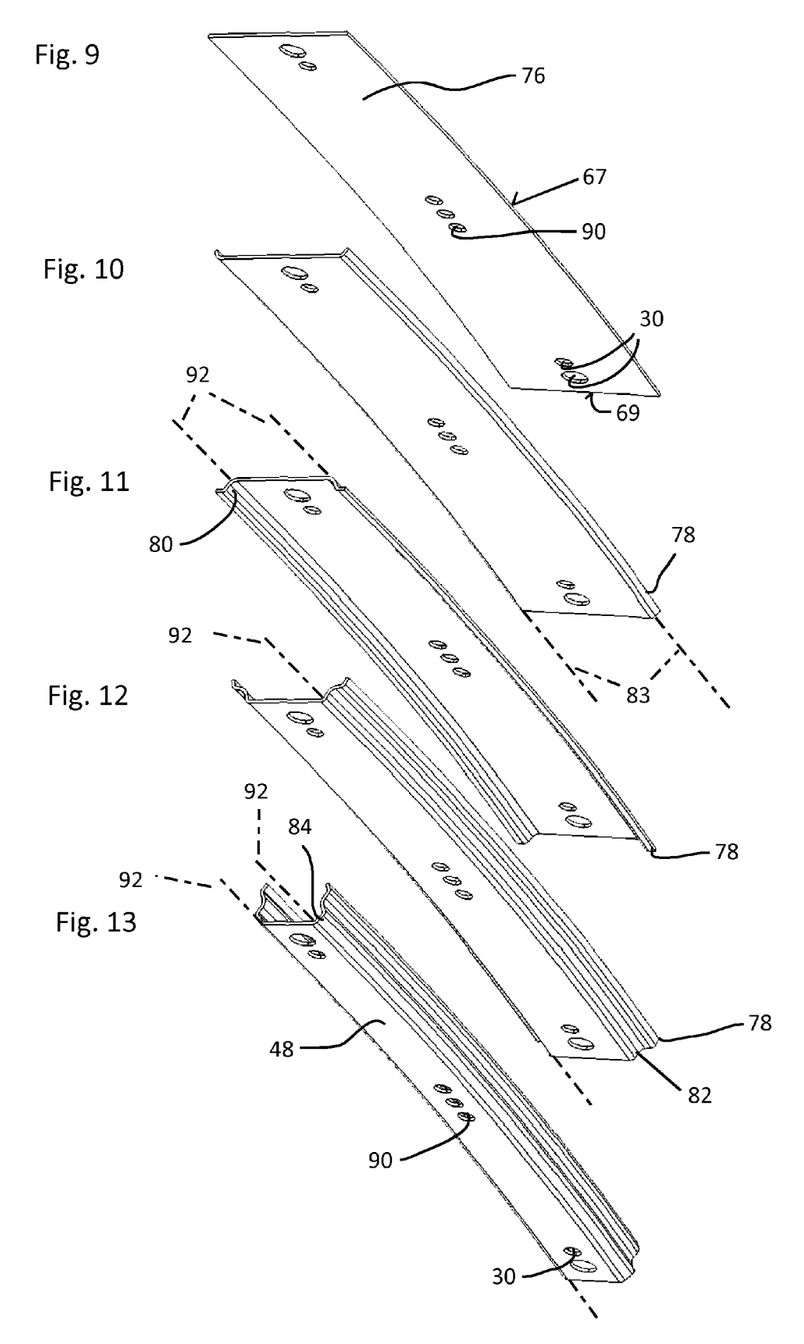
FIG. 9 is a perspective view of a blank for an inner rail.
FIG. 10 is the blank according to FIG. 9 after a first bending stage.
FIG. 11 is the blank according to FIG. 9 after a second bending stage.
FIG. 12 is the blank according to FIG. 9 after a third bending stage.
FIG. 13 is the blank according to FIG. 9 after a fourth bending stage.

FIG. 9 shows the rectangular blank 76 of the inner rail; like the blank 66 for the outer rail, it is also already curved.

FIG. 10 shows the blank 76 after carrying out the first bending step; in the process, first inner legs 78 have been formed. The bending process was carried out along a third bending line 83; it extends along an arc of a circle with a radius that deviates by maximally 3% from the radius 42 of curvature. After a second bending step shown by FIG. 11, second outer legs 80 are formed which lie inward of the first outer legs 78. After a third bending step, third outer legs 82 are bent out from the plane of the blank 76; they lie inward of the second outer legs 80.

In a fourth and last bending step, fourth outer legs 84 are formed; they lie inward of the third outer legs 82. Each bending step described for the outer rail and the inner rail respectively takes place about an arc of a circle with a radius that deviates from the radius 42 of curvature by maximally 3%.

Figure 14:
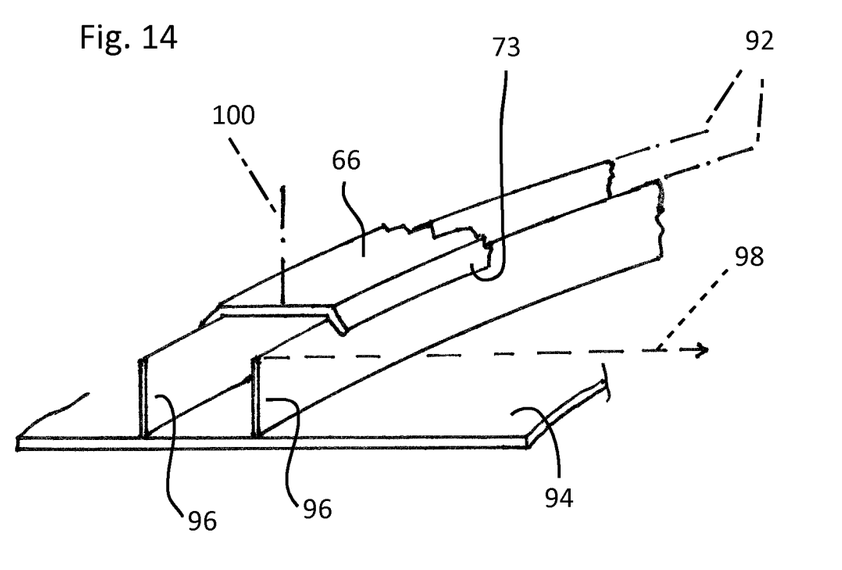
FIG. 14 is a schematic perspective view of a bending die as it can be used for the production of the rails according to FIGS. 1 and 3 as an alternative to the stamping die according to FIG. 5.

The blank 71 for the outer rail has a plurality of latching openings 86 which are periodically disposed one behind the other in the longitudinal direction. Each blank 71, 76 has fastening means 30 which are in this case configured as holes. With them, the rail can be screwed directly to a component of the floor assembly that extends substantially in the x-y-plane. The screwed used in the process extend in the z-direction. The blank 76 for the inner rail comprises pin holes 90; here, individual locking pins of a multi-pin lock as it is known, for example, from EP 1 316 465 B1, are passed through. FIG. 14 schematically shows a bending device as it can be used as an alternative to the stamping die 68 according to FIG. 5 in order to gradually deform into a rail a blank 66 according to FIG. 4, which is curved in the shape of a banana or a saber. The bending device has a base 94 from which two parallel bending bars 96 protrude upwards. With their top smooth edges, they form a bending line 92. The latter extends on an arc of a circle with the radius 98; this radius 98 differs by a maximum of 3% from the radius 42 of curvature. Its center lies above the base 94; the radius 98 extends parallel to the plane of the base 94. The bending bars 96 form bending lines 92. A blank 66 is already placed on the upper edges of the bending bars 96; a first bending step has been carried out along the bending lines 92; a first leg 73 has already been prepared on both sides. The bending line 92 extends in the vicinity of the longitudinal edge 67. Like the finished rail, the intermediate condition reached is axially symmetrical to an axis 100 which is a midperpendicular to the base flange 48 of the subsequent rail.

A bending die for the production of the rails according to FIGS. 6-13 differs from the bending die according to FIG. 14 as follows: The bending bars now extend in a straight line. They remain parallel to each other. The distance of the bending line from the base 94 is no longer constant, as in FIG. 14, but changes; it still lies on an arc of a circle. The radius 98 now extends perpendicular to the base 94 in the plane of the bending bar.

While specific embodiments of the invention have been shown and described in detail to illustrate the application of the principles of the invention, it will be understood that the invention may be embodied otherwise without departing from such principles.

The invention claimed:

1. A motor vehicle comprising:
   a floor assembly; and
   a seat comprising:
      a seat frame;
      a seat region;
      a backrest; and
      a rail guide comprising at least one pair of rails having a floor rail and a seat rail and balls disposed between the rails of the pair of rails, the rails of the pair of rails being displaceable relative to each other along a displacement path in a longitudinal direction, which is substantially parallel to an x-axis, the seat rail comprising bolts or holes for fastening to the seat frame, the seat frame being disposed above the pair of rails, wherein the floor rail and the seat rail are each curved with the same circular radius of curvature, and the radius of curvature is between 1,500 and 3,000 mm and a center of curvature is located on a side of the pair of rails facing away from the seat frame,
   an actuating drive cooperating with the rail guide to form a longitudinal adjustment device, the actuating drive comprising a rotary drive unit having an output shaft;
   a gear unit comprising a spindle nut rotationally connected to the output shaft;
   a spindle nut; and
   a spindle comprising a spindle thread with which the spindle nut is in engagement, the spindle being curved with the same circular radius of curvature as the rails, and the spindle nut being a straight nut, wherein:
   the floor rail is connected to the floor assembly, and, in relation to a vehicle located in a horizontal x-y-plane, the backrest, in a rearmost position of the seat frame relative to the rail guide, is inclined rearwards at an angle of 10° to 15° measured from the vertical, and, in the foremost position of the seat frame relative to the rail guide, is inclined rearwards at an angle of 5° to 10° measured from the vertical, with the change of angle between the two positions being at least 4° the rail guide being disposed in the motor vehicle so as to rise in the x-direction, a tangent drawn to the foremost region of the floor rail substantially extending parallel to the x-y-plane and deviating from the x-y-plane by only ±°3.

2. The motor vehicle according to claim 1, wherein the change of angle between the two positions is about 6°.

3. The motor vehicle according to claim 1, wherein the radius of curvature is between 1,800 and 2,500 mm.

4. The motor vehicle according to claim 1, wherein the spindle nut has a starting region on each axial side, the starting region is configured in a manner that expands outwards.

5. The motor vehicle according to claim 1, wherein a rear end of the rails constitutes the lowermost point of the rails, the designation rear corresponding to the negative direction of the x-direction, and low corresponding to the negative direction of the z-axis.

6. The motor vehicle according to claim 1, wherein the spindle has a length from 10 to 20 mm.

* * * * *